US011718360B1

(12) United States Patent
McAllister (10) Patent No.: US 11,718,360 B1
(45) Date of Patent: Aug. 8, 2023

(54) BICYCLE STEERING ANGLE SENSOR ASSEMBLY AND MOUNTING SYSTEM FOR A BICYCLE STEERING ANGLE SENSOR (71) Applicant: Daniel J. McAllister, Woodstock, GA (US)

(72) Inventor: Daniel J. McAllister, Woodstock, GA (US)

( * ) Notice: Subject to any disclaimer, the term of this patent is extended or adjusted under 35 U.S.C. 154(b) by 266 days.

(21) Appl. No.: 16/993,343

(22) Filed: Aug. 14, 2020

Related U.S. Application Data (60) Provisional application No. 63/034,669, filed on Jun. 4, 2020.

(51) Int. Cl.
*B62J 45/41* (2020.01)
*B62J 45/422* (2020.01)

(52) U.S. Cl.
CPC ............. *B62J 45/41* (2020.02); *B62J 45/422* (2020.02)

(58) Field of Classification Search
CPC ......... B62J 45/41; B62J 45/422; B62J 45/415
See application file for complete search history.

(56) References Cited

U.S. PATENT DOCUMENTS

| 7,669,690 | B2* | 3/2010 | Makabe | B62K 5/01 180/443 |
| 8,056,918 | B2* | 11/2011 | Miyashiro | F16F 9/535 280/272 |
| 8,606,464 | B2* | 12/2013 | Suzuki | B62K 21/00 180/219 |
| 8,978,809 | B2* | 3/2015 | Mori | B62K 19/32 180/219 |
| 10,152,875 | B2* | 12/2018 | Khaligh | B62M 6/50 |
| 2009/0302557 | A1* | 12/2009 | Hara | F16F 9/125 180/219 |

* cited by examiner

*Primary Examiner* — Minnah L Seoh
*Assistant Examiner* — Harold Eric Pahlck, III
(74) *Attorney, Agent, or Firm* — Hanrahan Law Firm, P.A.; Benjamin M. Hanrahan (57) ABSTRACT A mounting system for a bicycle steering angle sensor is presented herein. The mounting system is capable of being mounted to a steering assembly of a bicycle with an angle sensor coaxially aligned with the steering axis. The steering assembly includes a steering tube, a stem and a headset, such that the headset is structured to provide a rotatable interface between the steering tube and a frame head tube. The mounting system includes a housing defining an interior portion and a bottom mounting portion. The bottom mounting portion of the housing is fixedly mountable to a portion of the steering assembly of the bicycle via a top cap mounting fastener. The angle sensing device is disposed within the housing and at least partially rotatable with the housing to determine an amount of angular rotation applied thereto. An attachment assembly maintains a coupler in a fixed position while the housing rotates.

10 Claims, 10 Drawing Sheets

BICYCLE STEERING ANGLE SENSOR ASSEMBLY AND MOUNTING SYSTEM FOR A BICYCLE STEERING ANGLE SENSOR

CLAIM OF PRIORITY/CROSS-REFERENCE TO RELATED APPLICATION

The present application is based on and a claim of priority is made under 35 U.S.C. § 119(e) to provisional patent application Ser. No. 63/034,669, filed on Jun. 4, 2020, the contents of which are incorporated herein in their entirety by reference.

FIELD OF THE INVENTION

The present invention is generally directed to a mounting assembly for a device capable of measuring the rotational movement of bicycle handlebars during operation of a game, application or software used to simulate riding, racing or training on a bicycle.

BACKGROUND OF THE INVENTION

Stationary cycling is a low-impact or in some cases no-impact workout that has been around for many years. Historically, stationary cycling involves the use of a complete, stand-alone special-purpose exercise machine that resembles a bicycle, but does not have functional wheels that an ordinary bicycle would have. Instead, the exercise machine, often referred to as a "spin bike," may include a saddle or seat, pedals, and a form of handlebars arranged such that the exerciser is seated in a position similar to that of an ordinary bicycle rider. In some cases, weighted or magnetic resistance mechanisms are built into the exercise machine.

In other instances, an ordinary bicycle can be adapted to function as a stationary bicycle by mounting or securing the bicycle to a fixture such as, but not limited to, a bicycle roller, stand or "trainer." Bicycle trainers are often referred to as devices to which the rear portion of the bicycle (e.g., the rear wheel, rear hub, rear portion of the frame, rear frame forks, etc.) mounts and in some cases can provide resistance to the bicycle during use. In this manner, rollers, stands or trainers can be used by cyclists to warm up before a race or by virtually any user or exerciser in his or her own home to convert an ordinary or operable bicycle into a stationary mounted bicycle or exercise machine. In some cases, the rear wheel of an ordinary or operable bicycle may be removed in order to attach or mount the bicycle (e.g., at the rear hubs) to the stand or trainer. Accordingly, some rollers, stands and/or trainers allow the rider or user to pedal an ordinary bicycle (sometimes, but not always, with the rear wheel removed) to feel resistance based on the internal settings of the trainer or other fixture.

Riding a bicycle on a trainer or other like fixture historically is often described as a miserable, painful, lonely, and mind-numbing experience. That, however, has rapidly changed in recent years. As an example, some trainer manufacturers have developed "Smart Trainers," which are trainers that can be connected to an application or device, either wirelessly or wired, that can control the resistance applied to the rear wheel or pedals of the bicycle. The application or device can then provide workout simulations of various types to help the rider achieve various or desired fitness goals. Although a potential improvement, the "Smart Trainers" are still described as being boring or mind-numbing, since the rider will often be staring at a blank wall or in some cases, trying to pass time by watching television or other unrelated multimedia broadcast.

Recently however, advances in technology have made stationary cycling much more engaging and interactive. For instance, using the Internet or other network, riders and users can interact with an instructor, and pit themselves against other people from around the World. In addition, there is at least one known virtual reality cycling system—ZWIFT®—which is an Internet-based subscriber-paid virtual reality game. More in particular, a user is able to connect his or her smart trainer to the ZWIFT® game or system to participate in a realistic, engaging and more enjoyable experience while riding indoors. The ZWIFT® game has real three-dimensionally GPS mapped courses of a number of real cities on Earth, and at least one fictitious island known as "Watopia" in the Pacific Ocean. The graphics are compelling and an online community of at least 1.1 million subscribers exists at this filing.

Furthermore, the ZWIFT® game requires the rider to physically engage in a similar manner as he or she would have to while riding in the "real world," with two exceptions—1. there are no brakes implemented in the ZWIFT® game, and 2. the user does not steer the bicycle.

In December of 2019, ZWIFT® released the first crude versions of a "steering course" for virtual mountain bike use. With the advent of a rider-steered course in a stationary environment came the need for a device that has not yet existed, and had not yet been imagined.

Furthermore, in some instances, the front portion of the bicycle can be mounted to a front mounting device, which can, but does not necessarily need to allow for an adjustment or change in the gradient of the bicycle by raising and lowering the front end of the mounted bicycle. Accordingly, as used herein, the terms "elevator" or "gradient adjustment device" refers to a device or assembly on which the front of the bicycle is attached and which can be used to adjust or change the height of the front end of the bicycle, and therefore, the gradient or angle of the mounted bicycle relative to the ground or support surface. It should be noted that, in some cases, the front wheel of the mounted bicycle is removed and the front forks of the bicycle are secured to the elevator, gradient adjustment device or other front end mounting device. In other cases, the front wheel may remain on the mounted bicycle while the mounted bicycle or wheel is attached or secured to elevator or other device.

In any event, the elevator or other like gradient adjustment device is designed to raise and lower the front end of the bicycle as the virtual game or system moves through the three-dimensional maps or courses. Raising the front end of the mounted bicycle from its normal, level orientation (while maintaining the rear end of the bicycle substantially in place) is designed to simulate the rider traveling uphill or up a slope; whereas lowering the front end of the bicycle from its normal, level orientation (while maintaining the rear end of the bicycle substantially in place) is designed to simulate the rider travelling downhill, or down a slope.

Presently, there is one such company with an elevator device or gradient adjustment device—WAHOO FITNESS® has a device called the KICKR® Climb, which can simulate gradients from 0 to +20% by raising the front of the bicycle, and gradients from 0 to −10% by lowering the front of the bicycle.

In any event, to implement a steering course or steering functionality into the game or system, the game or system to which the smart trainer communicates must know when the rider has turned the handlebars and by how much. This information can then be transmitted to the game or system for processing and implementation into the simulation course.

Initial systems have implemented the use of a cellular phone or smart phone, and more specifically, the internal gyroscope functionality thereof to sense inputs from the rider. There are, however, many inherent problems with this approach. For example, not only is the use of smart phone or cell phone crude and ineffective, but it also relies on the rider to fix the phone to the bicycle. Since there is no effective, universal way to perfectly secure a phone to the center of the steering axis of the bicycle, the input sensed by the phone is necessarily defective. In such a case, the phone or gyroscope thereof may move in an arcuate manner, instead of pivoting on a single point, thereby leading to trigonometric errors. In addition, as the phone wobbles or rattles due to various crude mounting techniques, the phone may obtain false information relative to any rotation of the handlebars, and may, in some cases, falsely record steering movement when none was intended by the rider.

Accordingly, as in-game steering evolves to make the user experience more engaging, a robust and reliable method of mounting a sensor and electronics to the steering of the bicycle will become a necessity.

Furthermore, many older bicycles had a component to connect the handlebars to the front steering fork or steering tube known as a "Quill Stern" or "Gooseneck." This style of connection was often unreliable and would frequently work loose and cause an unsafe condition. Accordingly, bicycle steering took a large leap forward when the steering tube of the fork was extended above the top bearing of the steering and a steering stem was implemented to grasp the steering tube. This greatly increased surface area, resulting in a highly reliable connection for even the most rigorous conditions, such as mountain biking. As part of the system, a "top cap" is used to adjust the tension on the steering bearings, and works as a secondary safety device to keep the stem on the bicycle in case it does loosen up.

There is, thus, a need in the art for a mounting system for a steering sensor that can be reliably used via an external system, such as a VR game or other like simulation. The proposed mounting system will house angle or other like sensors and will be universally mountable to any bicycle that includes a "top cap" styled system, which have been in production on most bicycles since the mid-1980's.

SUMMARY OF THE INVENTION

Accordingly, the present invention is generally directed to a steering angle sensor assembly attachable to a steering assembly or steering mechanism of a bicycle and configured to accurately measure or determine the direction and amount of angular rotation of the bicycle handlebars during operation of a bicycle simulation game or application. The steering assembly or steering mechanism of the bicycle, as used herein, includes a steering tube, a stem and a headset. The headset is a set of components that are structured and configured to provide a rotatable interface between the steering tube and a fixed frame head tube.

More in particular, the steering angle sensor assembly of at least one embodiment includes a housing defining a bottom portion fixedly mountable to a portion of the steering assembly, such as, for example, a top cap anchor. In other words, with the top cap of the bicycle removed, the housing of at least one embodiment can be attached to the top cap anchor and essentially replace the top cap. In this manner, the housing of at least one embodiment is rotatable with rotation of the steering assembly of the bicycle. In other words, movement or rotation of the handle bars causes the stem to rotate, which causes the steering tube and the housing of the present invention to rotate.

Seated within the housing is an angle sensing device, which may include but is not limited to a rotary potentiometer, rotary encoder, or virtually any device capable of measuring an amount of angular rotation. A first portion of the angle sensing device may be attached to and rotatable with the housing, while a second portion of the angle sensing device remains in a fixed or substantially fixed position. Accordingly, in at least one embodiment, a cap or coupler is attached to the second portion of the angle sensing device and maintained in a fixed or substantially fixed position via an attachment assembly interconnecting the cap or coupler with a fixed frame portion of the bicycle.

These and other objects, features and advantages of the present invention will become more apparent when the drawings as well as the detailed description are taken into consideration.

BRIEF DESCRIPTION OF THE DRAWINGS

Like reference numerals refer to like parts throughout the several views of the drawings provided herein.

DETAILED DESCRIPTION OF THE INVENTION

Figure 3:
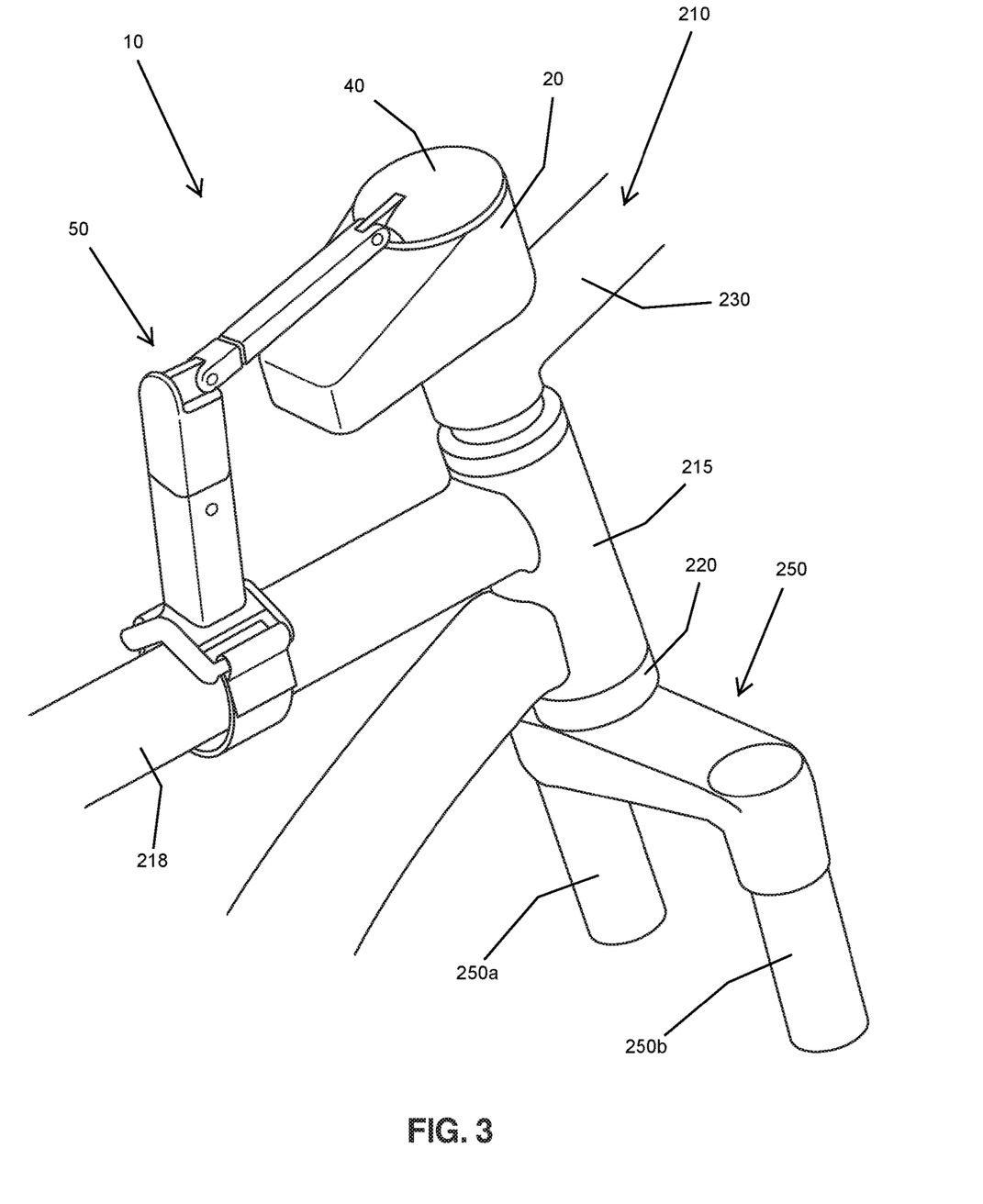
FIG. 3 illustrates the mounting assembly mounted to a portion of the steering assembly of a bicycle as disclosed in accordance with at least one embodiment of the present invention.
Figure 6:
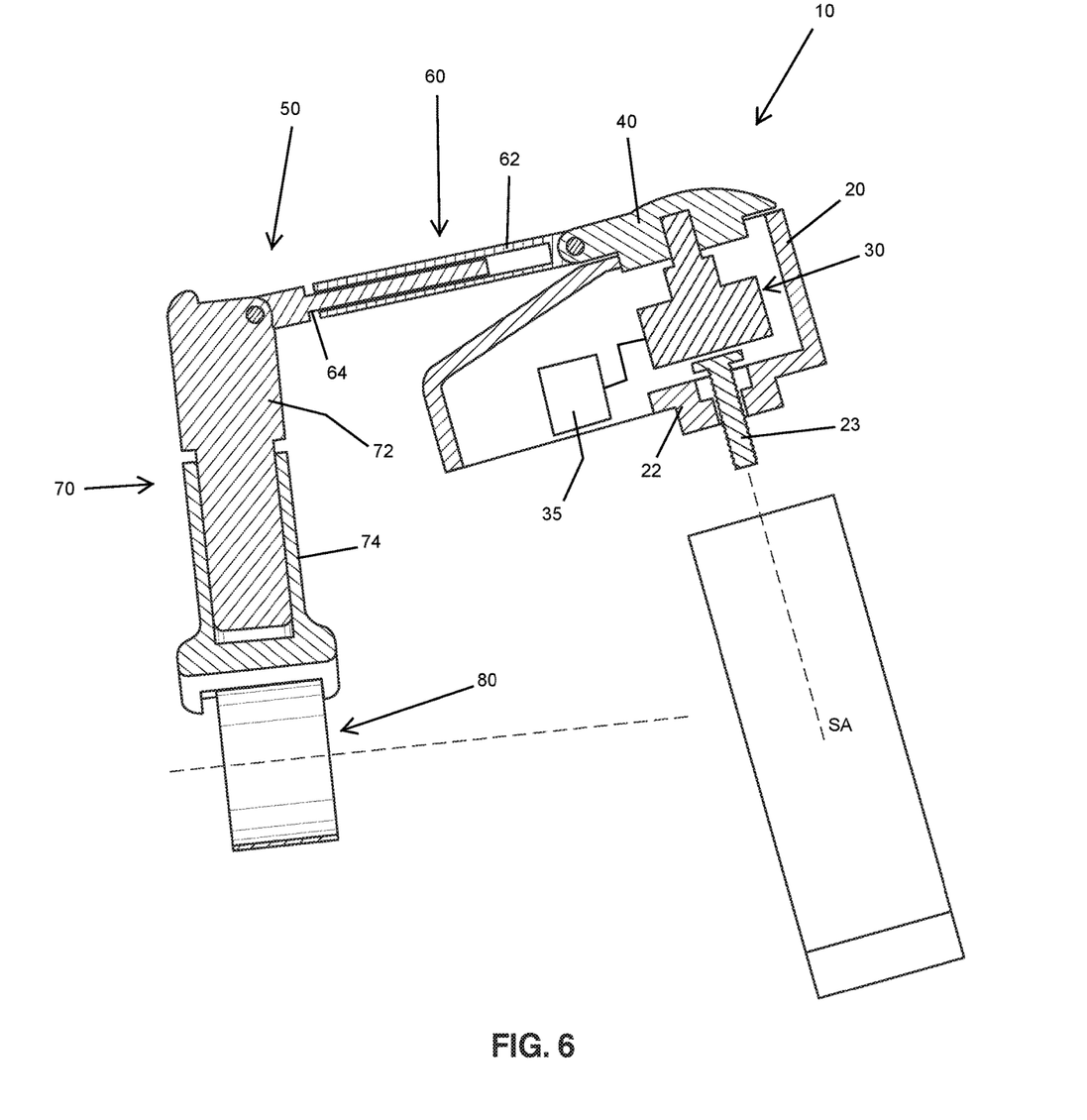
FIG. 6 is a cut away and partially exploded view of the mounting assembly being mounted to a steering assembly of a bicycle as disclosed in accordance with at least one embodiment of the present invention.
Figure 7:
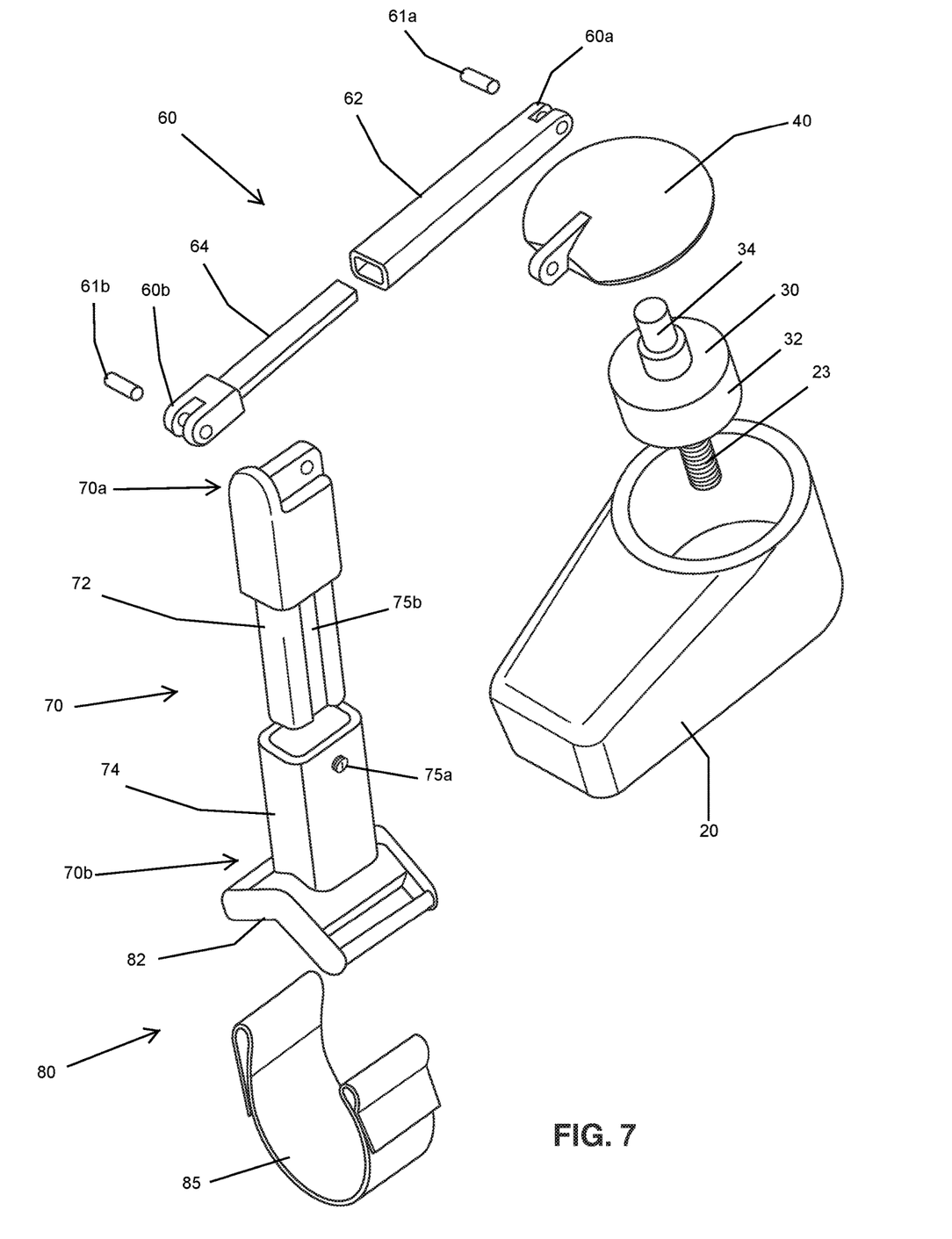
FIG. 7 is an exploded view of the mounting assembly as disclosed in accordance with at least one embodiment of the present invention.

As shown in the accompanying drawings, and with particular reference to FIGS. 3, 6 and 7, for example, the present invention is directed to a steering angle sensor assembly 10 and/or a mounting assembly for an angle sensing device which is capable of measuring or detecting an angle or amount of movement applied to the steering assembly 210 of a bicycle 200.

Figure 1A:
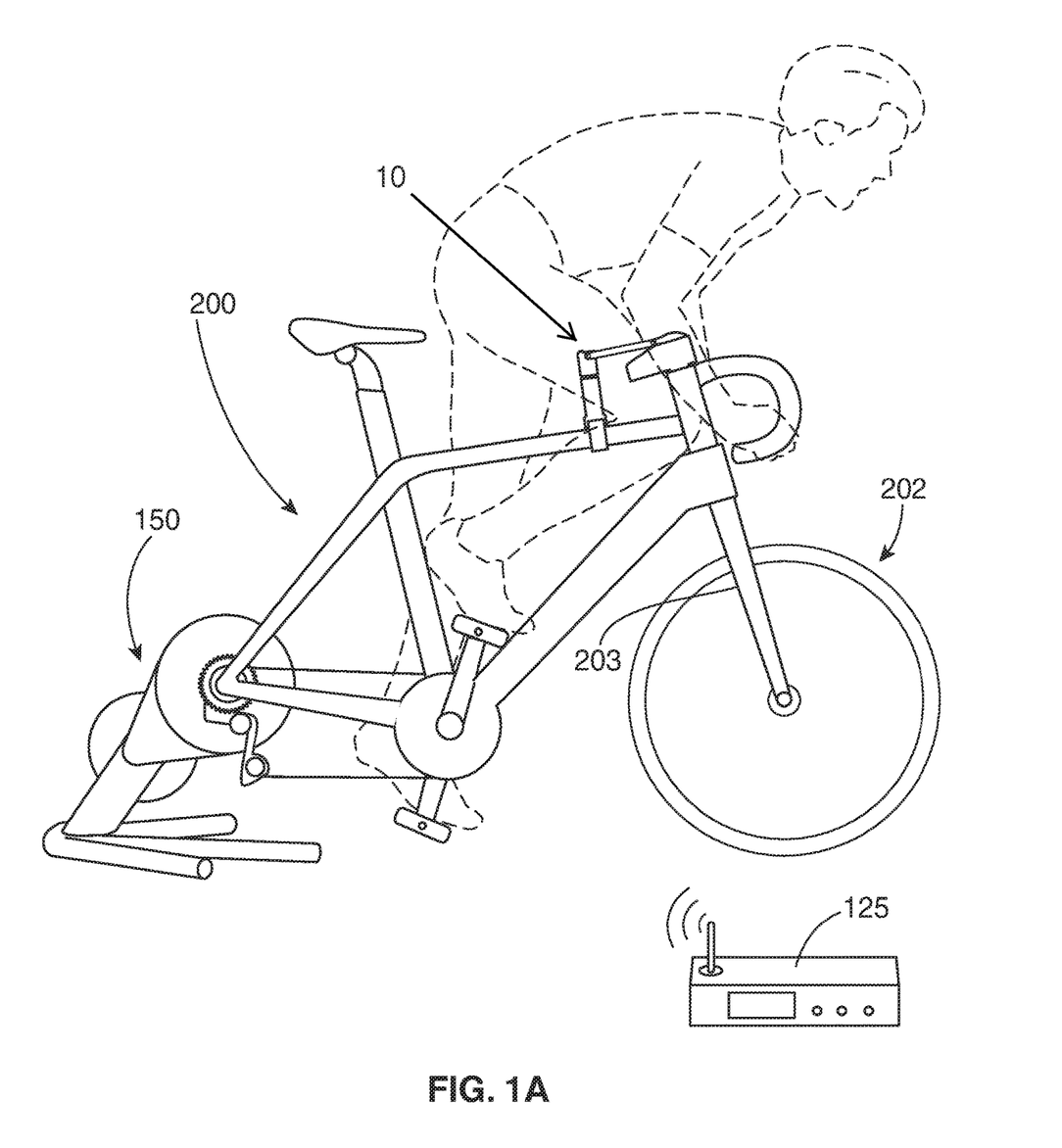
FIG. 1A illustrates an exemplary environment within which the mounting assembly of at least one embodiment of the present invention can operate.
Figure 1B:
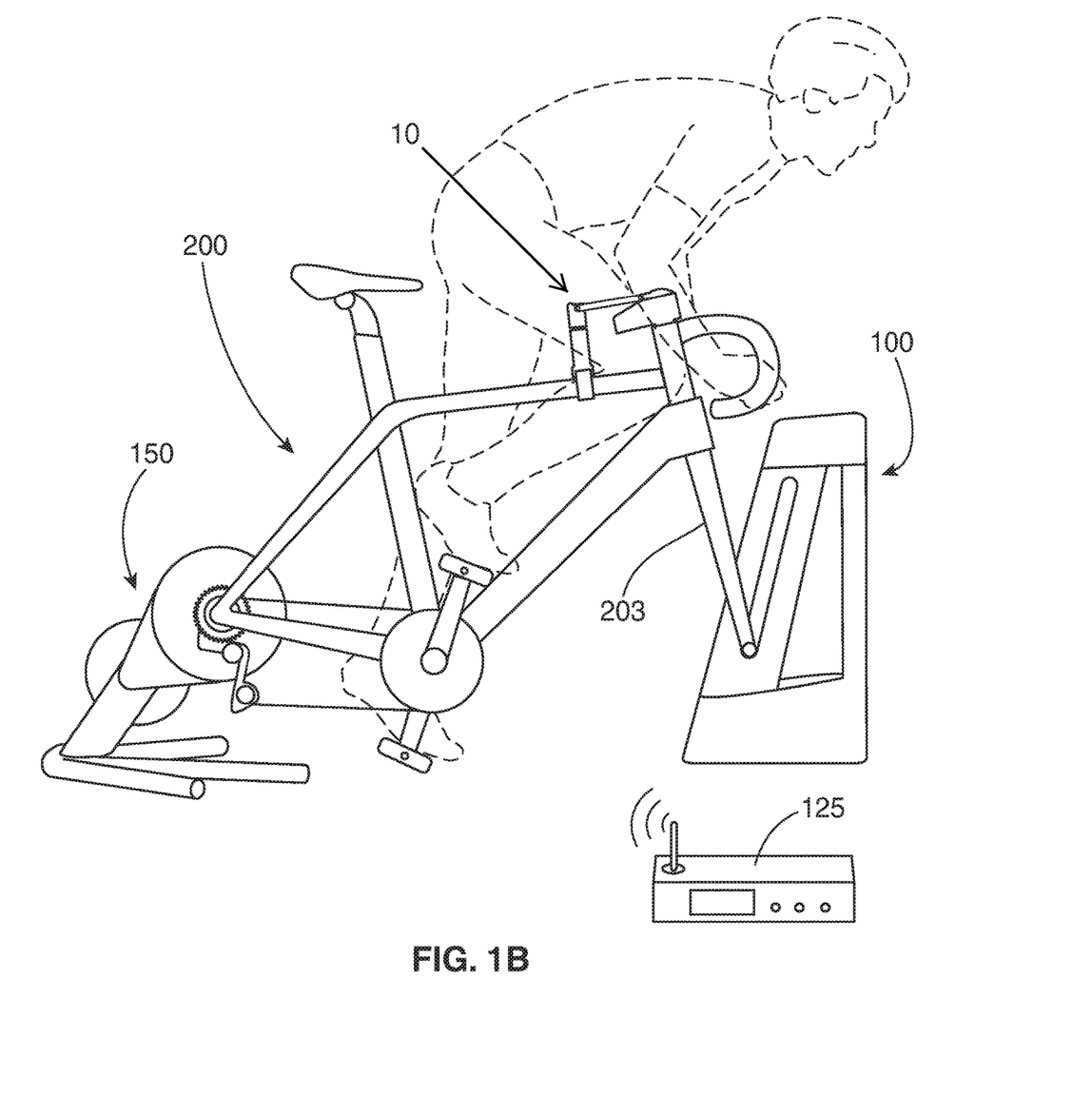
FIG. 1B illustrates another exemplary environment within which the mounting assembly of at least one embodiment of the present invention can operate.

With reference briefly to FIGS. 1A and 1B, exemplary non-limiting environments or systems are illustrated within which the steering angle sensor assembly 10 of the present invention may be implemented. As just an example, an ordinary and operable bicycle 200 may be mounted to a trainer 150, such as a smart trainer, for purposes of training, simulation or gaming. The smart trainer 150 may be communicative with an external system 125, either wirelessly or wired, for purposes of implementing a virtual reality, simulation or game, as described herein. For example, the external or other system 125 may be or may otherwise include a desktop computer, laptop computer, mobile computer, tablet computer, mobile phone, personal electronic device, game system, etc. capable of executing computer instructions for purposes of implementing a bicycle game or simulation. The system 125 may also include a display screen (e.g., in the case of a computer, tablet, mobile phone, etc.) or the system 125 may be connected to a monitor, television, or other separate display screen (not shown). As just an example, a ZWIFT® application may be executed on or by the external system 125 in order to implement the ZWIFT® game as described herein.

Furthermore, as shown in FIG. 1B, the bicycle 200 may, but need not necessarily, be mounted to a front end mounting device, generally referenced as 100, in a number of different manners, depending on the device and in some cases depending on the bicycle 200 itself. For example, the front wheel of the bicycle 200 may, in some cases be removed, allowing the front forks 203 of the bicycle 200 to be mounted to a front end mounting device 100. The front end mounting device 100 illustrated in FIG. 1B is referred to herein as an elevator or a gradient adjustment device which may be structured to raise and lower the front end of the bicycle 200 using internal mechanics, gears or systems, for example. Other, not shown, front end mounting devices may be used within the environment of the present invention, including those that raise and lower the bicycle, rotate or pivot about a single axis, move in an omnidirectional manner along the ground, etc. In other cases, for example, as illustrated in FIG. 1A, the front end or front wheel of the bicycle 200 may simply be disposed on the ground.

In this manner, the front end mounting device 100 and/or the smart trainer 150 may be operational with and communicative with a virtual reality cycling game or system, including but not limited to ZWIFT®, as described herein. It should be noted however, that the front end mounting device 100, trainer 150, and bicycle 200 illustrated in the Figures are for exemplary purposes only and should not be deemed limiting in any fashion. In other words, other front end mounting devices, trainers, stands, rocker plates, etc. can be used in connection with the various embodiments of the steering angle sensor assembly 10 of the present invention described herein.

Furthermore, FIGS. 2A, 2B, 3 and 4 illustrate a portion of a bicycle 200 to which the steering angle sensor assembly 10 of at least one embodiment will mount or attach. For example, the steering angle sensor assembly 10 of at least one embodiment will attach to a portion of the steering assembly, generally referenced as 210, of the bicycle 200. The steering assembly 210, as used herein, includes a series of components or structures that facilitate the steering of a bicycle 200 via rotation or pivoting of the handlebars 212.

More in particular, the steering assembly 210 of the bicycle 200 may include a steering tube 220, a stem 230 and a headset 240.

Figure 2A:
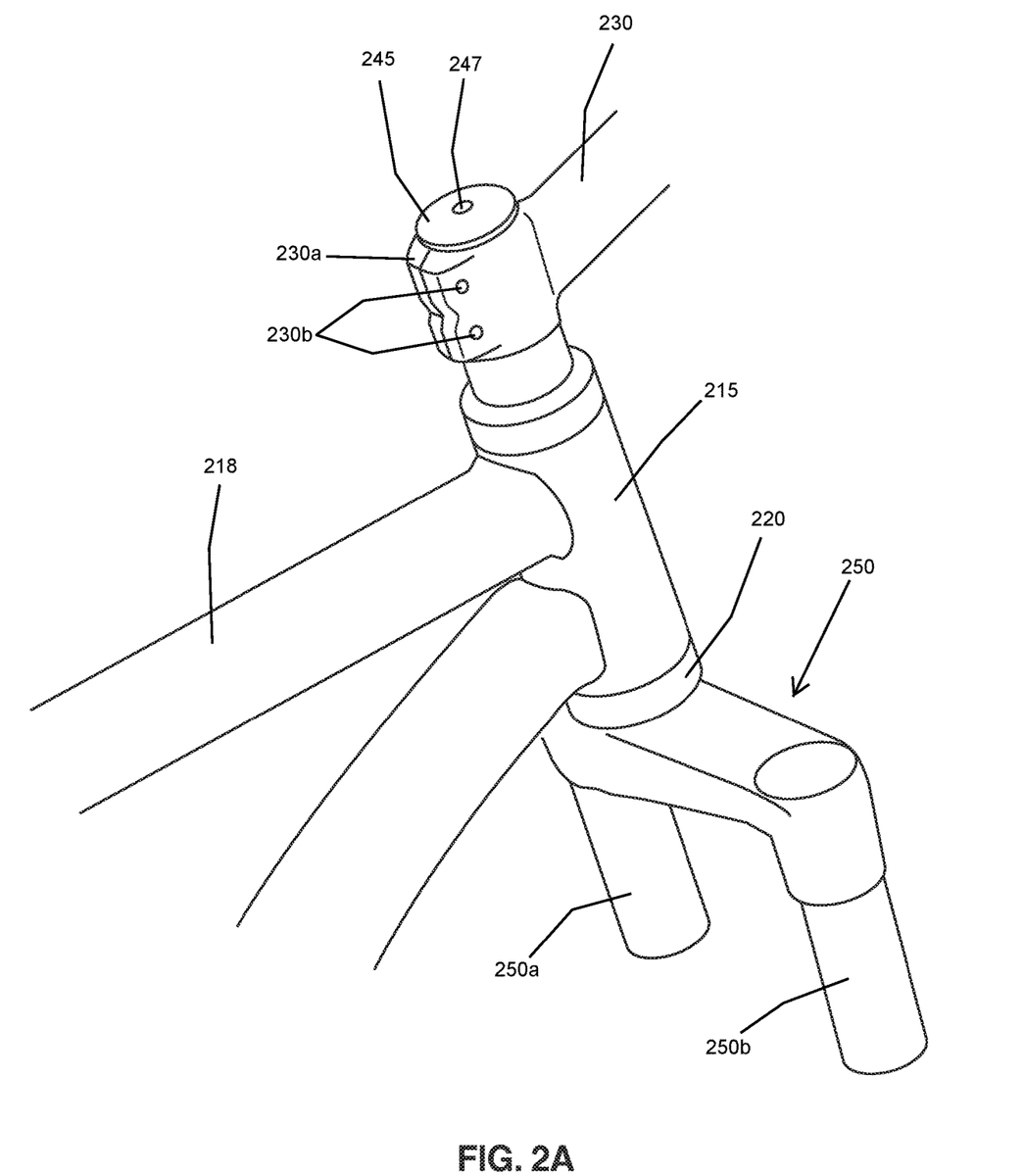
FIG. 2A is a partial illustration of an exemplary bicycle showing a threadless headset with a top cap.

More specifically, the steering tube 220 of the bicycle 200 attaches at one end to a fork 250, which includes arms 250a, 250b that extend down and attach to opposite sides of the front wheel 202 of the bicycle 200. The steering tube 220 extends up into and in many cases through a head tube 215, which is a fixed portion of the bicycle frame. The stem 230 is the component on the bicycle 200 which connects the handlebars 212 to the steering tube 220, such that rotation or pivoting of the handlebars translates to rotation of the steering tube 220. In the embodiment shown, the stem 230 is secured to the steering tube 220 via a clamp 230a and corresponding fasteners 230b, as shown in FIG. 2A, for example. Of course, other bicycles 200 may have different stems and a different connection mechanism between the stem 230 and the steering tube 220.

Furthermore, the headset 240, as used herein, is a set of components or structures of the bicycle 200 which provides a rotatable interface between the steering tube 220 and the fixed head tube 215 of the frame. There are a number of different types of headsets that differ from one another based on the way in which bearing(s) 242 (e.g., FIG. 4) are held in place or by where the bearings 242 are located (e.g., inside or outside of the head tube 215). In the illustrated example of FIGS. 2A, 2B, 3 and 4, a "threadless" headset is illustrated, although it should be noted that the assembly 10 of the present invention may mount to bicycles with other types of headsets, including, for example, threaded headsets.

Figure 2B:
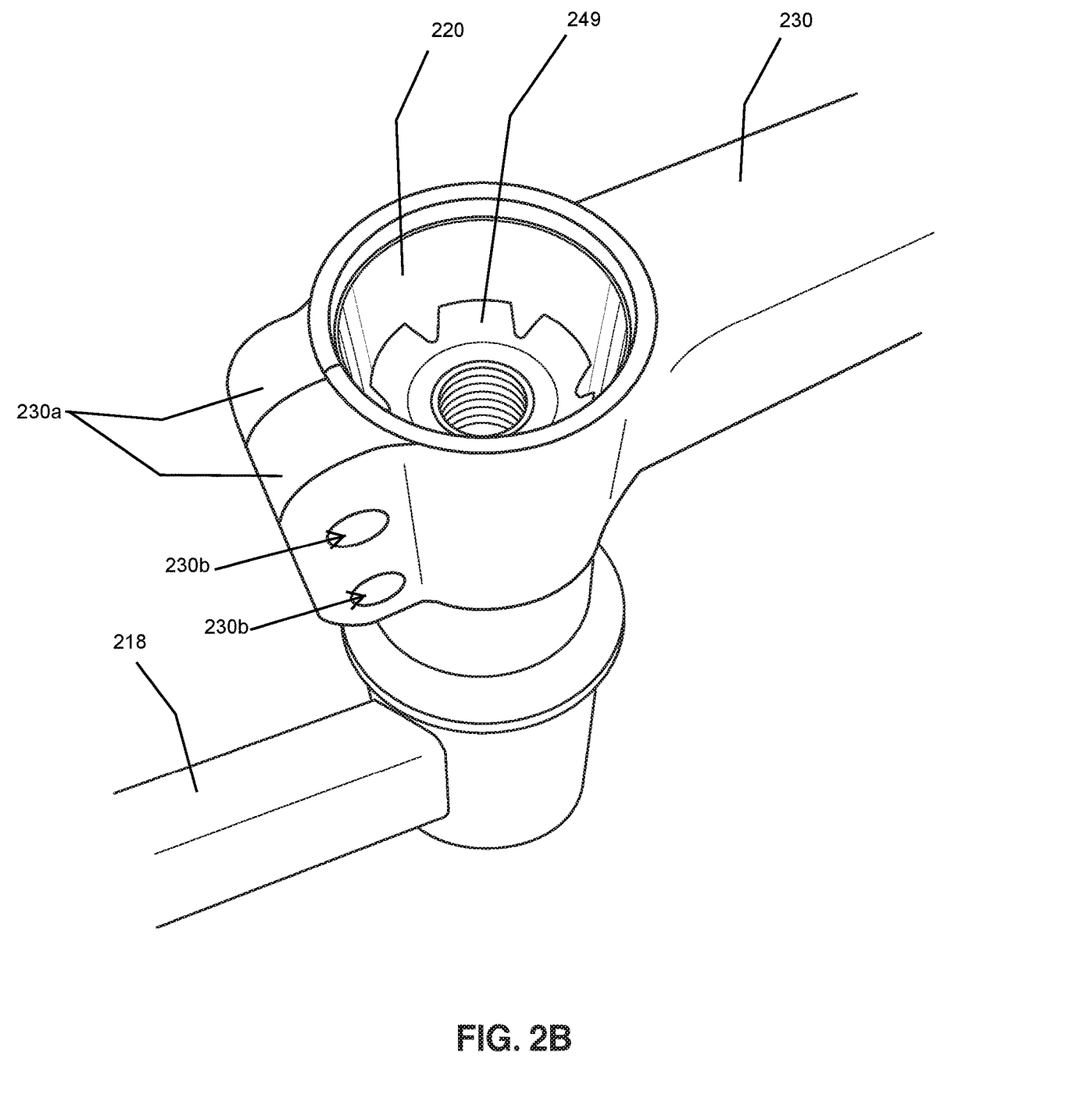
FIG. 2B illustrates the threadless headset shown in FIG. 1A with the top cap removed and exposing the top cap anchor disposed in an engaging relation with the steering tube.

In any evet, the headset 240 illustrated in the exemplary embodiment includes a number of components such as a top cap 245 mounted to the stem 230 and/or steering tube 220 via a top cap fastener 247 that interconnects the top cap 245 to an anchor 249. The anchor 249, as shown in FIG. 2B, is a star nut that engages the steering tube 220 by gripping the inside of the steering tube 220 with downward force. Of course, other anchors can be implemented or included as part of the bicycle head set 240. Tightening or loosening the fastener 247 (such as a bolt or screw) can adjust the tightness of the head set 240.

Figure 4:
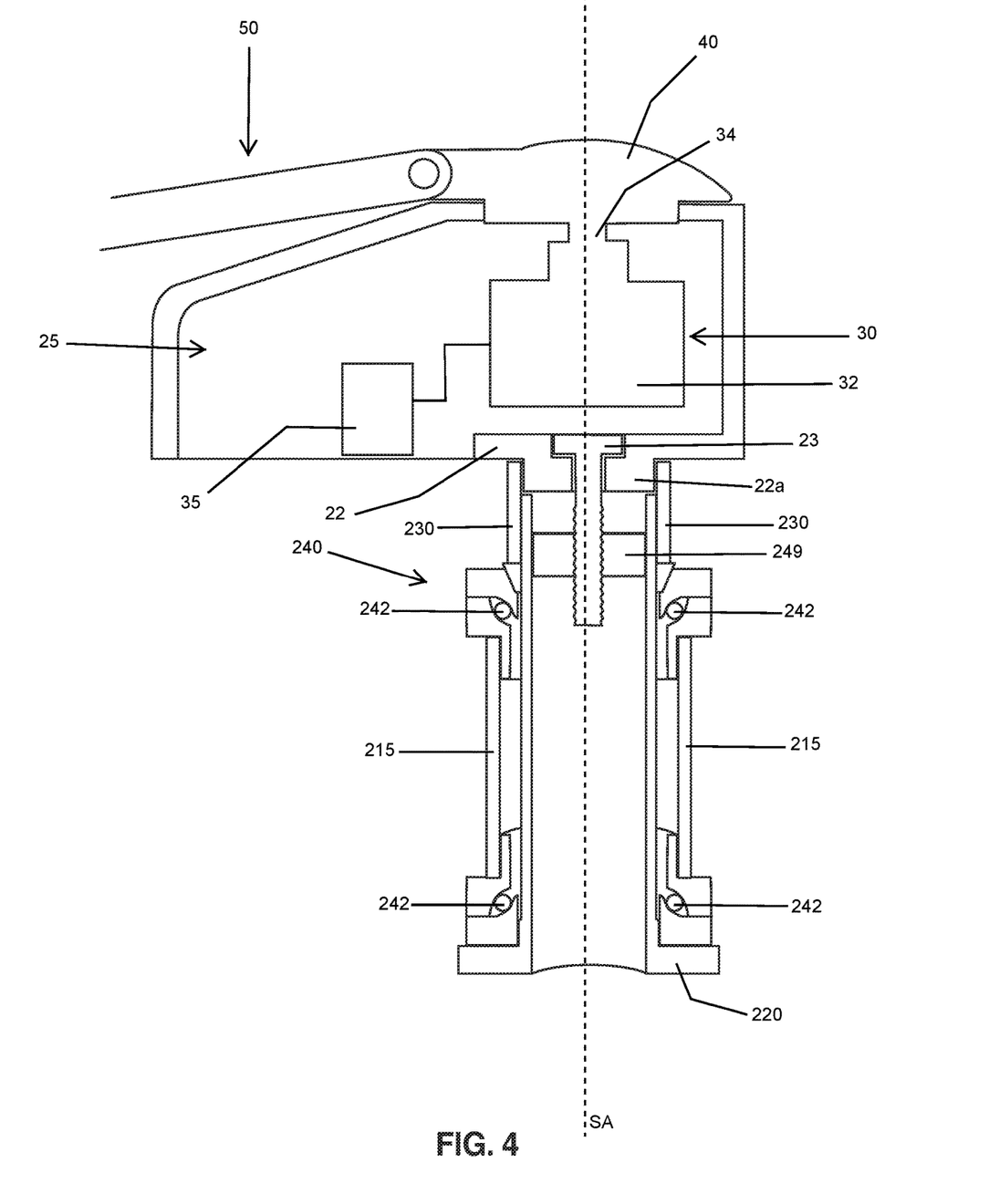
FIG. 4 is a side cut-away view of the mounting assembly mounted to the steering assembly of a bicycle with the top cap removed as disclosed in accordance with at least one embodiment of the present invention.

Furthermore, as represented in FIG. 3 and as shown in FIG. 4, the steering angle sensor assembly 10 of at least one embodiment of the present invention can be mounted to the bicycle by removing the top cap 245 and replacing the top cap 245 with a portion of the present invention, such as the housing 20, as described herein. A fastener 20a can be used to mount the housing 20 or other portion of the steering angle sensor assembly 10 to the anchor 249 of the head set 240. Other manners of mounting the housing 20 to the steering assembly 210 of the bicycle 200 may be contemplated within the full spirit and scope of the present invention, particularly, in the event a different headset is implemented on the bicycle.

For instance, the housing 20 of at least one embodiment of the present invention includes a bottom portion, represented as 22, which is fixedly mountable to a portion of the steering assembly 210, e.g., in the manner described above. In some cases, the bottom portion 22 of the housing 20 may include a downward projection or protrusion 22a which is sized and configured to seat within the stem 230, as shown in FIG. 4, for example. However, it is also contemplated that the bottom portion 22 of the housing 20 is sized to span across the top of the stem 230 without being disposed or seated therein. In other cases, the bottom portion 22 of the housing 20 may include a lip or shoulder (not shown) that is disposed about the outer periphery or surface of the stem 230.

Regardless of the shape and specific configuration of the bottom portion 22 of the housing 20, in at least one embodiment, a fastener 23 extends through the bottom portion 22 of the housing 20 and engages anchor 249 of the head set 240. In this manner, the fastener 23 may be similar in construction, shape and size as top cap fastener 247 which is used to secure the top cap 245 (now removed) to the anchor 249. In some cases, the fasteners 23, 247 can be interchangeable, while in other cases, fastener 23 which is sized and configured to mount the housing 20 to the head set 240 may be different in size and shape (particularly in terms of length and/or head size) than fastener 247.

Figure 5A:
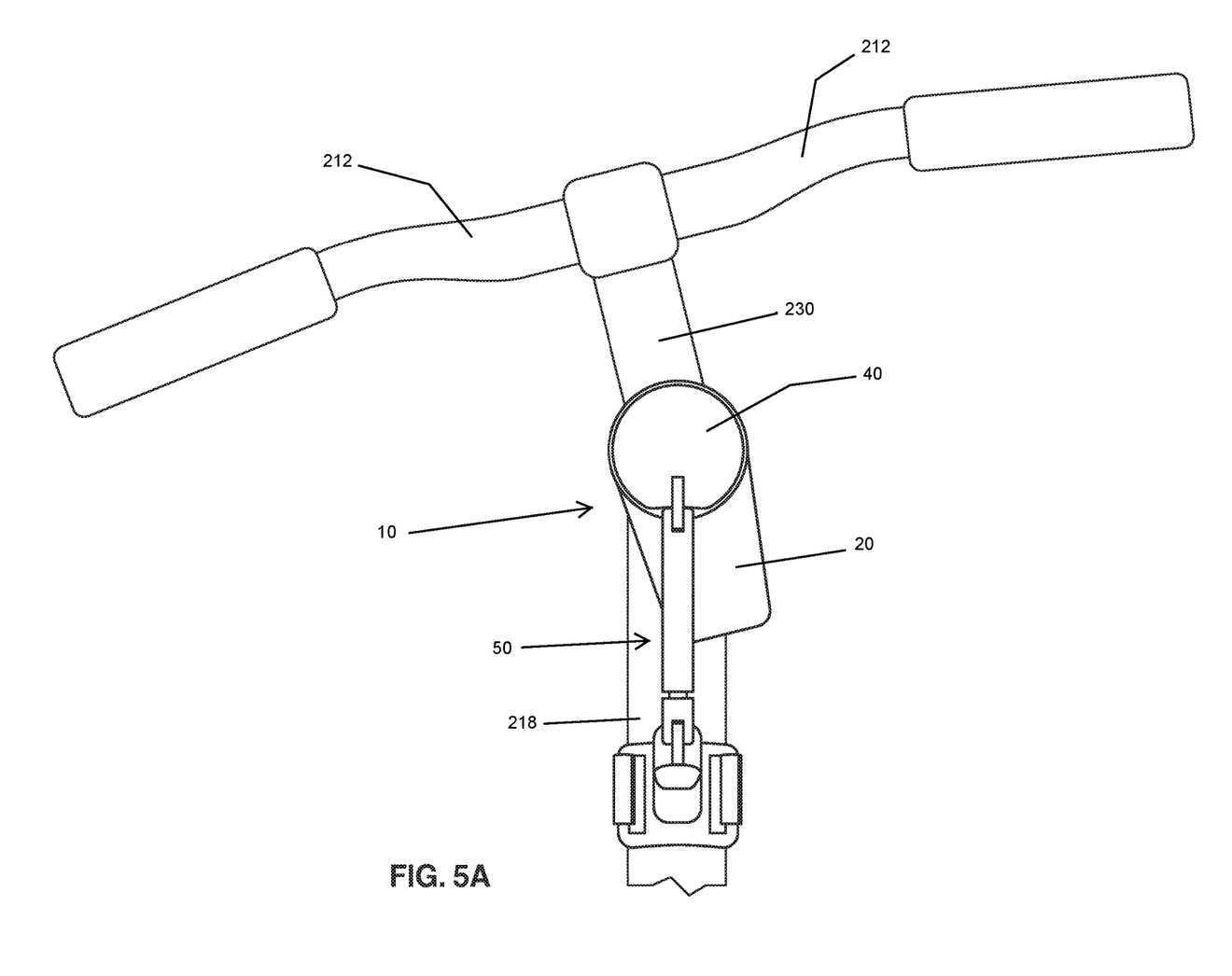
FIG. 5A is a top view of the mounting assembly mounted to the steering assembly of a bicycle with the handlebars rotated to the left and with the housing correspondingly rotated in a counterclockwise direction.
Figure 5B:
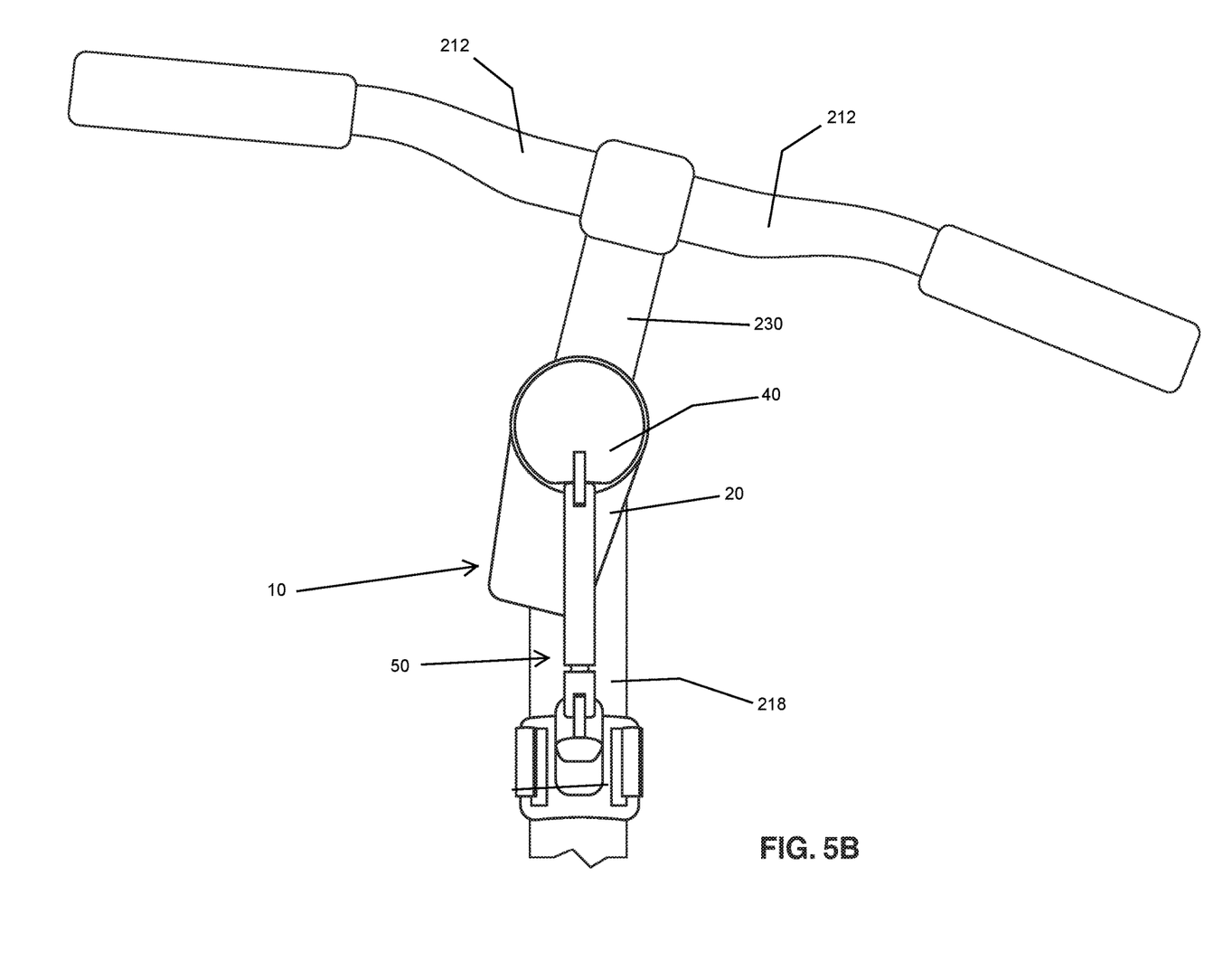
FIG. 5B is a top view of the mounting assembly mounted to the steering assembly of a bicycle with the handlebars rotated to the right and with the housing correspondingly rotated in a clockwise direction.

Accordingly, as will be apparent from the description herein, the housing 20 of at least one embodiment is rotatable with the steering assembly 210 of the bicycle 200, and in particular, with the handlebars 212, stem 230 and steering tube 220. In other words, as the handle bars 212 of the bicycle 200 are rotated or pivoted, the housing 20 also rotates or pivots, as represented in FIGS. 5A and 5B, for example.

Furthermore, in at least one embodiment, the housing 25 defines an interior 25 within which an angle sensing device 30 is disposed. The angle sensing device 30, as used herein, is virtually any device or mechanism that is structured and configured to detect or measure an amount of rotation or angular movement applied thereto. Accordingly, as an example, the angle sensing device 30 may be in the form of or otherwise include, but is in no way limited to a potentiometer, rotary potentiometer, rotary encoder, etc. In this manner, the angle sensing device 30 may include a first portion 32 that is rotatable with the housing 20, and a second portion 34 that is maintained in a fixed or substantially fixed position. For example, the first portion 32 of the angle sensing device 30 may, in some embodiments be attached or fixed to the housing 20 such that rotation of the housing 20 (caused by rotation of the handle bars 212) translates to the same angular rotation of the angle sensing device 30.

Referring now to FIGS. 4 and 6, in at least one embodiment, the angle sensing device 30 is coaxial to the steering axis of the bicycle, represented as SA. In particular, the steering axis SA, as used herein, is the axis about which the steering assembly 210 pivots, such as, the axis about which the steering tube 220 rotates. As shown in FIG. 4, the fastener 23 is also often, but not necessarily, coaxial with the steering axis SA. In any event, mounting the angle sensing device 30 coaxial or in an axial aligned manner with the steering axis SA allows the angle sensing device 30 to obtain an accurate measurement and reading of the amount of rotation applied to the handlebars 212 of the bicycle 200, and in particularly, without the need for any adjustment calculations.

More in particular, with reference to FIGS. 3 through 7, the steering angle sensor assembly 10 of at least one embodiment includes a coupler or cap 40 which is maintained in a fixed or substantially fixed position, even when the housing 20 rotates in the manner described herein. For instance, the housing 20 is movable, pivotal or rotatable relative to the cap or coupler 40 of at least one embodiment. In some cases, the cap or coupler 40 is communicative with the interior portion 25 of the housing 20 or otherwise connected to the angle sensing device 30 disposed therein. Such a configuration allows the second portion 34 of the angle sensing device 30 to be fixed, engaged or connected to the cap or coupler 40, which in turn maintains the fixed or substantially fixed positioning of the second portion 34 of the angle sensing device 30 relative to the first portion 32 thereof, which again, may be fixed, engaged or connected to the housing 20.

Accordingly, rotation or movement of the handle bars 212 translates to rotation or movement of the housing 20 while the cap or coupler 40 remains in a fixed or substantially fixed position. Again, this is exemplified in FIGS. 5A and 5B, for example. More specifically, in FIG. 5A, the handle bars 212 of the bicycle 200 are rotated partially to the left. This causes the housing 20 to also move or rotate with the handle bars 212 (e.g., in a counterclockwise direction) due to its connection with the headset 240 as described herein. While the housing 20 rotates in the counterclockwise manner shown in FIG. 5A, the cap or coupler 40 remains fixed in position.

Similarly, with reference to FIG. 5B, the handle bars 212 of the bicycle 200 are rotated partially to the right. This causes the housing 20 to also move or rotate with the handle bars 212 (e.g., in a clockwise direction) due to its connection with the headset 240 as described herein. While the housing 20 rotates in the clockwise manner shown in FIG. 5B, the cap or coupler 40 again remains fixed in position.

The movement of the housing 20 shown in FIGS. 5A and 5B, for example, causes the first portion 32 of the angle sensing device 30 to rotate while the second portion 34 thereof remains fixed or substantially fixed in position due to its connection with the cap or coupler 40. In this manner, the angle sensing device 30 is able to determine the direction (e.g., left or right) and angle of rotation of the handle bars 212. Such information can be transmitted or communicated to an external system 125 or to a smart trainer 150 via a transmitter or communication device generally represented as 35. The transmitter or communication device 35 can be communicative with any external system 125 or smart trainer 150 capable of receiving the information or data for use in a game or simulation. The communications with the external system 125 may be via wireless communication protocols (e.g., Bluetooth, Zigbee, Ant+, Internet protocol, internal or private network) or wired communication protocols. The external system 125 or smart trainer 150 can then use or process the information obtained by the various embodiments of the present invention pertaining to the angular movement of the housing 20 and therefore the angular movement of the handlebars 212 to operate a more realistic and effective virtual reality game, simulation or training model.

It should also be noted that within the housing 20 may be one or more batteries (not shown) which provide power certain components, including, for example, the angle sensing device, transmitter, etc. This arrangement allows certain embodiments of the present invention to operate in a fully wireless environment, eliminating the possibility of one or more cords creating a potentially dangerous situation for the rider during operation.

Further features of at least one embodiment of the present invention include an attachment assembly, generally referenced as 50, that is structured to maintain the cap or coupler 40 in the fixed or substantially fixed position, as described herein. In some cases, the attachment assembly 50 is adjustable in at least one, or in some cases, a plurality of directions, and/or may include a universal or adjustable mount, allowing the attachment assembly 50 to attach to bicycles 200 having different shapes, configurations and overall structural features.

For instance, the attachment assembly 50 of at least one embodiment provides a fixed or substantially fixed connection between the cap or coupler 40 and a fixed frame portion of the bicycle, such as, but not limited to a fixed top tube, generally referenced as 218. Accordingly, the attachment assembly 50 includes one or more adjustable arm assemblies 60, 70 and a mounting structure 80 interconnected between the cap or coupler 40 and the top tube or other fixed frame portion 215 of the bicycle 200.

In order to accommodate bicycles of different shapes and sizes, and in particular, in order to attach to bicycles of different shapes and sizes, the adjustable arm assemblies 60, 70 are lengthwise adjustable in at least one direction, and in some cases, a plurality of directions and/or angles. For example, the attachment assembly 50, and in particular, a first adjustable arm assembly 60 may include cooperative telescoping arms 62, 64 lengthwise adjustable (e.g., in a first or horizontal direction) by extending or compressing the arms 62, 64. More specifically, the first adjustable arm assembly 60 may include a proximal end 60*a* attached to the cap or coupler 40. In some cases, a dowel or pin 61*a* may be used to interconnect arm 62 to the cap or coupler 40 through corresponding holes or channels. This may allow a pivotal movement between arm 62 and the cap or coupler 40 in an up and down direction, providing further adjustment there between. In other cases, the arm 62 may be fixed to the cap or coupler 40 such that no movement is allowed there between.

Further, arm 64 may be slidably engaged with arm 62 to provide a lengthwise adjustability there between, with a distal end 60*b* of the first arm assembly 60 attached to a proximal end 70*a* of a second adjustable arm assembly 70, for example, via dowel or pin 61*b* and corresponding holes and channels. Such a connection may provide a pivoting engagement between the first and second arm assemblies 60, 70 thereby allowing for additional adjustment. Other embodiments, however, may have a fixed or non-movable engagement between the first and second arm assemblies 60, 70.

Additionally, the second adjustable arm assembly 70 may, in some embodiments, include cooperative telescoping arms 72, 74 lengthwise adjustable (e.g., in a second or vertical direction) by extending or compressing the arms 72, 74 relative to one another. For instance, arm 74 may be slidably engaged with arm 72 to provide a lengthwise adjustability there between. A set screw or other like faster 75*a* disposed through outer arm 74 may align with a channel, groove 75*b* or a plurality of recesses disposed on inner arm 72. Tightening of the set screw 75*a* within groove 75*b* will engage arms 72, 74 together thereby restricting further slidable extension or compression there between.

It should also be noted that in order to accommodate bicycles of different shapes and sizes, the attachment assembly of some embodiments of the present invention may be adjustable or movable in a plurality of directions and angles and may include structures or components other than telescoping arms or in addition to telescoping arms.

Attached to the distal end 70*b* of the second adjustable arm 70 is a mounting structure 80 that can mount to a fixed frame portion, such as top tube 215, of the bicycle 200. In some embodiments, the mounting structure 80 may include a first rigid mount 82 and cooperative flexible strap 85 attachable thereto. For instance, rigid mount 82 may include an inverted V-shaped configuration, or an inverted U-shaped configuration that is positioned against the fixed frame portion 215 of the bicycle 200 of virtually any shape, size and configuration. In some cases, the rigid mount 82 may be lined with rubber, foam or other like material to provide a gripping or non-slip engagement with the bicycle 200.

The rigid mount 82 may be secured to the bicycle 200, for example, to the top tube 215 thereof, with an adjustable strap 85 or other like device, including for example, a clamp, clasp, clip, etc. In the embodiment illustrated in FIG. 7, for example, an elongated attachment structure 85 or strap is illustrated and will attached to opposite sides of the rigid mount 82 and wrap completely around the bicycle frame portion 215. In some cases, the strap may be adjusted in length to accommodate bicycle frames of various sizes.

It should also be noted that within the full spirit and scope of the present invention the mounting structure 80 may include virtually any structure(s) that is/are capable of adjustably securing to a frame portion, e.g., a top tube 215, of a bicycle such as but in no way limited to the V-shaped rigid mount and flexible strap as illustrated, C-clamps that warp partially around the frame portion, clips, clamps, buckle(s), hook and loop type fasteners (e.g., VELCRO®) a cam over type of locking strap or buckle, a strap with snaps, hooks, pins, buttons, etc.

Since other modifications and changes varied to fit particular operating requirements and environments will be apparent to those skilled in the art, the invention is not considered limited to the example chosen for purposes of disclosure, and covers all changes and modifications which do not constitute departures from the true spirit and scope of this invention. This written description provides an illustrative explanation and/or account of the present invention. It may be possible to deliver equivalent benefits using variations of the specific embodiments, without departing from the inventive concept. This description and these drawings, therefore, are to be regarded as illustrative and not restrictive.

Now that the invention has been described,

What is claimed is:

1. A mounting device for a steering angle sensor assembly attachable to a steering assembly of a bicycle, the steering assembly of the bicycle comprising a steering tube, a stem and a headset, the headset providing a rotatable interface between the steering tube and a frame head tube, said mounting device comprising:
    a housing comprising a bottom portion fixedly mountable to a portion of the steering assembly, wherein said housing is rotatable with rotation of the steering assembly of the bicycle, and
    said housing further comprising an interior portion configured to receive an angle sensing device therein,
    a coupler attachable to the angle sensing device, wherein said housing is movable relative to said coupler, said coupler being maintained in an at least substantially fixed position via an attachment assembly, and
    wherein said attachment assembly comprises an adjustable arm assembly and a mounting structure, said adjustable arm assembly being lengthwise adjustable in at least two directions.

2. The mounting device as recited in claim 1 wherein said attachment assembly is interconnected between said coupler and a fixed frame portion of the bicycle.

3. The mounting device as recited in claim 1 wherein said adjustable arm assembly comprises a first telescoping arm assembly lengthwise adjustable in a first direction, said first telescoping arm assembly comprising a proximal end and a distal end, said proximal end of said first telescoping arm assembly being connected to said coupler.

4. The mounting device as recited in claim 3 wherein said adjustable arm assembly further comprises a second telescoping arm assembly lengthwise adjustable in a second direction, said second telescoping arm assembly comprising a proximal end and a distal end, said proximal end of said second telescoping arm assembly being connected to said distal end of said first telescoping arm assembly, said distal end of said second telescoping arm assembly being connected to said mounting structure.

5. The mounting device as recited in claim 4 wherein said mounting structure comprises an elongated attachment section configured to wrap at least substantially around a fixed frame portion of the bicycle.

6. The mounting device as recited in claim 5 wherein said elongated attachment section of said mounting structure comprises a flexible strap.

7. A mounting system for a bicycle steering angle sensor, the mounting system being mounted to a steering assembly of a bicycle, the steering assembly of the bicycle comprising a steering tube, a stem and a headset, the headset providing a rotatable interface between the steering tube and a frame head tube, said mounting system comprising:

a housing comprising an interior portion and a bottom mounting portion, said bottom mounting portion of said housing being fixedly mountable to a portion of the steering assembly of the bicycle via a top cap mounting fastener, a coupler maintained in a fixed position via an attachment assembly, wherein said housing is rotatable relative to said coupler, wherein said attachment assembly is interconnected between said coupler and a fixed frame portion of the bicycle, wherein said attachment assembly comprises an adjustable arm assembly and a mounting structure, wherein said adjustable arm assembly is adjustable in at least two directions, and wherein said mounting structure is mounted to the fixed frame portion of the bicycle.

8. The mounting system as recited in claim 7 wherein said adjustable arm assembly comprises a first telescoping arm assembly lengthwise adjustable in a first direction, said first telescoping arm assembly comprising a proximal end and a distal end, said proximal end of said first telescoping arm assembly being connected to said coupler.

9. The mounting system as recited in claim 8 wherein said adjustable arm assembly further comprises a second telescoping arm assembly lengthwise adjustable in a second direction, said second telescoping arm assembly comprising a proximal end and a distal end, said proximal end of said second telescoping arm assembly being connected to said distal end of said first telescoping arm assembly, said distal end of said second telescoping arm assembly being connected to said mounting structure.

10. The mounting system as recited in claim 9 wherein an angle sensing device is disposed within said interior portion of said housing, said angle sensing device being configured to measure an amount of rotation of said housing.

\* \* \* \* \*